(12) United States Patent
Lindsey et al.

(10) Patent No.: US 12,273,590 B2
(45) Date of Patent: *Apr. 8, 2025

(54) MANAGING LIVE VIDEO STREAM CONNECTIONS

(71) Applicant: LiveView Technologies, LLC, Orem, UT (US)

(72) Inventors: Steven Richard Lindsey, Lehi, UT (US); Skyler J Call, Lehi, UT (US); Charles G. Hayward, Woodland Hills, UT (US)

(73) Assignee: LiveView Technologies, LLC, American Fork, UT (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/506,303

(22) Filed: Nov. 10, 2023

(65) Prior Publication Data
US 2024/0080523 A1 Mar. 7, 2024

Related U.S. Application Data

(63) Continuation of application No. 17/663,341, filed on May 13, 2022, now Pat. No. 11,856,259, which is a
(Continued)

(51) Int. Cl.
*H04N 21/45* (2011.01)
*H04N 21/2187* (2011.01)
*H04N 21/442* (2011.01)
*H04N 21/466* (2011.01)
*H04N 21/6334* (2011.01)

(52) U.S. Cl.
CPC ..... *H04N 21/4532* (2013.01); *H04N 21/2187* (2013.01); *H04N 21/44224* (2020.08); *H04N 21/4667* (2013.01); *H04N 21/6334* (2013.01)

(58) Field of Classification Search
CPC .......... H04N 21/4532; H04N 21/2187; H04N 21/44224; H04N 21/4667; H04N 21/6334; H04N 21/23805; H04N 21/44204; H04N 21/6582; H04L 12/14; H04L 12/1403; H04M 15/58; H04M 15/8207; H04M 15/8214; H04M 15/39; H04W 4/24
See application file for complete search history.

(56) References Cited

U.S. PATENT DOCUMENTS

| | | | |
|---|---|---|---|
| 6,983,478 B1 * | 1/2006 | Grauch | G06Q 30/02 348/E7.07 |
| 8,792,563 B2 | 7/2014 | Yova et al. | |

(Continued)

*Primary Examiner* — Oschta I Montoya
(74) *Attorney, Agent, or Firm* — TraskBritt

(57) ABSTRACT

Various embodiments of the disclosure relate to minimizing data usage over a communication link. A system may include a back-end network configured to: receive, via a first connection, a video stream from at least one camera; transmit, via one or more second connections, the video stream to one or more user devices; cause the video stream from the back-end network to a user device of the one or more user devices to be terminated; and cause the video stream from the at least one camera to the back-end network to be terminated in response to determining that the back-end network is not transmitting the video stream to at least one user device of the one or more user devices. Associated methods are also disclosed.

20 Claims, 10 Drawing Sheets

Related U.S. Application Data continuation of application No. 17/064,022, filed on Oct. 6, 2020, now Pat. No. 11,368,753, which is a continuation-in-part of application No. 14/989,733, filed on Jan. 6, 2016, now Pat. No. 10,798,249.

(56) References Cited

U.S. PATENT DOCUMENTS

| | | |
|---|---|---|
| 2007/0143493 A1* | 6/2007 | Mullig .................... H04L 65/70 709/232 |
| 2007/0294423 A1 | 12/2007 | Brockenbrough et al. |
| 2010/0306413 A1 | 12/2010 | Kamay |
| 2011/0296460 A1* | 12/2011 | Jin ................... H04N 21/41407 725/37 |
| 2012/0262576 A1 | 10/2012 | Sechrist et al. |
| 2013/0265446 A1 | 10/2013 | Nicas et al. |
| 2013/0286211 A1 | 10/2013 | Cao |
| 2013/0344896 A1* | 12/2013 | Kirmse ............... G06F 16/9537 455/456.3 |
| 2014/0258451 A1 | 9/2014 | Harris et al. |
| 2016/0094805 A1 | 3/2016 | Wang et al. |
| 2016/0284170 A1* | 9/2016 | Kasmir ............... H04L 12/2825 |
| 2017/0164372 A1 | 6/2017 | Gupta et al. |

* cited by examiner

MANAGING LIVE VIDEO STREAM CONNECTIONS

CROSS-REFERENCE TO RELATED APPLICATIONS

This application is a continuation of U.S. patent application Ser. No. 17/663,341, filed May 13, 2022, now U.S. Pat. No. 11,856,259, issued Dec. 26, 2023, which is a continuation of U.S. patent application Ser. No. 17/064,022, filed Oct. 6, 2020, now U.S. Pat. No. 11,368,753, issued Jun. 21, 2022, which is a continuation-in-part of U.S. patent application Ser. No. 14/989,733, filed Jan. 6, 2016, now U.S. Pat. No. 10,798,249, issued Oct. 6, 2020, the disclosure of each of which is hereby incorporated herein in its entirety by this reference.

TECHNICAL FIELD

The present disclosure relates generally to live video stream connections. More specifically, the present disclosure relates to reducing data usage for live video streams over costly or slow communication links.

BACKGROUND

With the advent of IP cameras and cellular/satellite data networks, it is possible to place cameras virtually anywhere in the world and stream live video over the Internet to computers and mobile devices. However, streaming live video over cellular or satellite metered data connections can be expensive. Video streaming is one of the most data consuming services transmitted over data networks. Even with advances in video compression, video streaming may consume over 50 Gigabytes of data per month due to streaming cameras over data networks. This problem becomes worse when the number of simultaneous viewers viewing a camera increases resulting in a linear multiplier of data usage equal to the number of viewers.

Another major contributor to data usage cost is the amount of time a live camera feed is viewed. The longer a camera is viewed, the more the data charges increase. It is not uncommon to have users connect to a camera and then either switch to a different window on their computer/mobile device or walk away from their computer leaving the camera streaming to the computer for hours or even days at a time. This common behavior adds unnecessary data cost, which can result in thousands of dollars per month per camera in data overage charges.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Cameras, such as IP-enabled cameras, may be configured to operate on networks and may be configured to support both multicast video streaming and unicast video streaming. By way of example, unicast video streaming may be used for over-the-Internet live video streaming. Also by way of example, two implementations may be used for unicast streaming of live video from cameras: (1) direct connection to the camera, and (2) video relay server connection to the camera.

Figure 1:
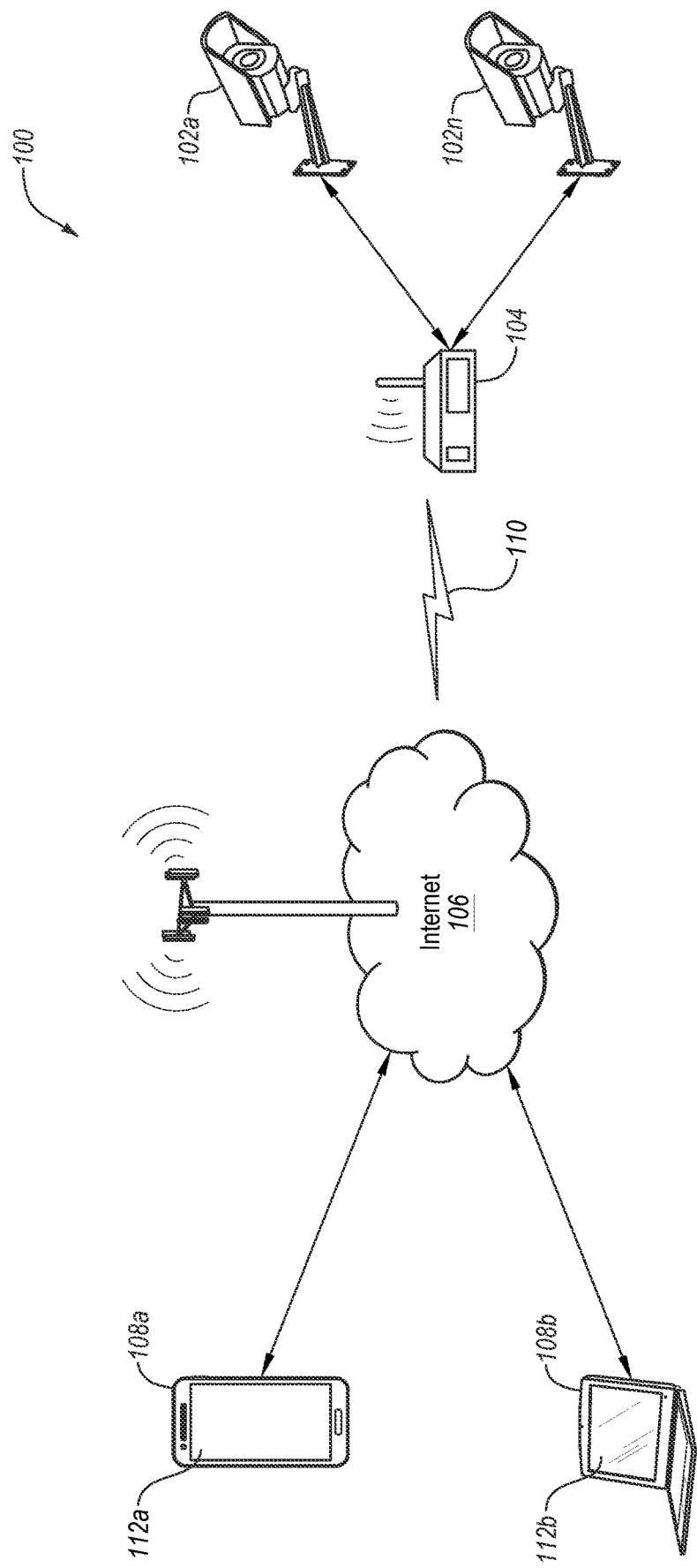
FIG. 1 illustrates a live video streaming system configured with a direct network connection to one or more cameras.

FIG. 1 illustrates a live video streaming system configured with a direct network connection to one or more cameras. Live video streaming system 100 includes one or more cameras 102*a*-102*n* (collectively referred to as "cameras 102"). Cameras 102 couple according to conventional wired or wireless methods to a wireless modem 104. Wireless modem 104 may be configured to operate over a wireless communication channel according to one or more wireless standards including, but not limited to, cellular (mobile) and satellite standards. Cellular and mobile standards may include GPRS, UMTS, HSPA, EVDO, WiMax, etc., and may also be commonly known as mobile broadband services, whether fixed or mobile. Satellite standards may operate using one or more various satellite cellular standards and may further include low earth orbiting and high altitude broadband. Other wireless standards, such as Wi-Fi, are also contemplated as being a standard through which the modem may also communicate live video data.

Cameras 102 may be configured as IP-enabled cameras and support both multicast video streaming and unicast video streaming. By way of example, unicast video streaming may be used for over-the-Internet streaming via Internet 106 for sending a live video stream.

In a first implementation, a direct connection to a camera provides streaming of live video from a camera by connecting an IP-enabled camera 102 to a wireless modem 104. Connection between wireless modem 104 and Internet 106 occurs over a wireless channel 110. In live video streaming system 100 where the camera is connected to the user device 108*a*, 108*b* using a direct connection implementation, a user of user device 108*a*, 108*b* enters an IP address of camera 102 in a browser or application 112*a*, 112*b* on user device 108*a*, 108*b* causing camera 102 to stream live video from camera 102 to user device 108*a*, 108*b*. Camera 102 continues streaming live video to user device 108*a*, 108*b* until the user closes the browser or application 112*a*, 112*b*. The amount of data usage of this streaming is a function of the bit rate of the live video stream multiplied by the duration of live video streaming by camera 102.

Live video streaming system 100 may further include a video management system (VMS) (not shown) where a camera directly connects to a VMS, which also provides a direct connection for the user to the camera allowing the user to view a live video stream. A VMS manages the IP Addresses (URLs) for one or more cameras in one application.

In live video streaming system 100, when one user wants to watch the same camera as another user, then two video streams are transmitted, one for each respective user. Such a scenario essentially doubles the amount of data transmitted over the cellular/satellite data network. The number of simultaneous camera viewers becomes the multiplier for the amount of data that is transmitted over the metered data network, such as over wireless channel 110.

Along with potentially high data usage resulting from simultaneous camera users, another problem with having users connect directly to IP-enabled cameras is the saturation of capable bandwidth of the data communication link, such as the saturation of wireless channel 110. As the amount of data throughput increases with the increase in simultaneous users, the data communication link will reach a saturation point where the communication link cannot transmit any more data, thereby resulting in buffer underruns and increased latency for all users. Furthermore, implementations using direct connection from the end user to the one or more cameras may be inherently unsecure because the camera needs to be open to all possible IP addresses (no firewall blocking) to allow users from various Internet locations to connect to the camera.

Figure 2:
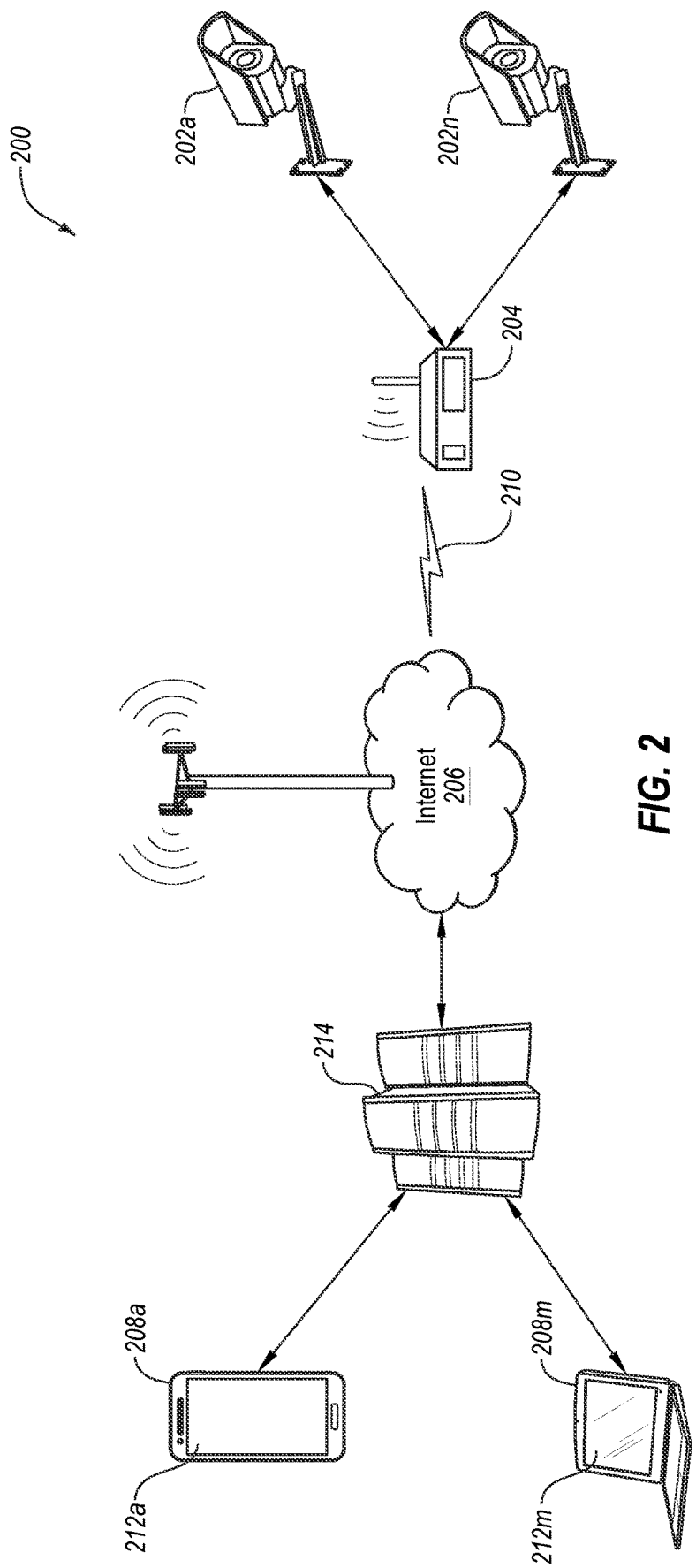
FIG. 2 illustrates a live video streaming system configured with a video relay server.

FIG. 2 illustrates a live video streaming system configured with video relay servers (VRS) connected to one or more cameras. Live video streaming system 200 includes one or more cameras 202a-202n (collectively referred to as "cameras 202"). Cameras 202 couple according to conventional wired or wireless methods to a wireless modem 204. Wireless modem 204 may be configured as a wireless modem operating according to one or more wireless standards including, but not limited to, cellular (mobile) and satellite standards. Cellular and mobile standards may include GPRS, UMTS, HSPA, EVDO, WiMax, etc., and may also be commonly known as mobile broadband services. Satellite standards occurring over one or more various satellite cellular standards may also include stationary or orbiting satellites as well as high altitude airborne broadband. Other wireless standards, such as Wi-Fi, are also contemplated as being a standard through which the modem may also communicate live video data.

Cameras 202 may be configured as IP-enabled cameras and support both multicast video streaming and unicast video streaming. By way of example, unicast video streaming may be used for over-the-Internet live video streaming via Internet 206. Video Relay Server (VRS) implementation of live video streaming provides streaming live video from a camera by connecting an IP-enabled camera 202 to a wireless modem 204. Connection between wireless modem 204 and Internet 206 occurs over a wireless channel 210.

In live video streaming system 200 configured with a VRS connection to the camera implementation, a user of user device 208a-208m interacts via a browser or application 212a-212m on a user device 208a-208m that interfaces via Internet 206 with a VRS 214 that, in turn, brokers or supports the interaction with camera 202, thereby causing camera 202 to stream live video from camera 202 to VRS 214. VRS 214 continues streaming live video to user device 208a-208m until the user closes the browser or application 212a-212m.

Live video streaming system 200 configured to utilize a Video Relay Server (VRS) 214 overcomes several problems or shortcomings common with a direct connection to camera implementation as embodied in live video streaming system 100. These shortcomings include eliminating data redundancies of the camera communication links, for example, over wireless channel 210, when multiple viewers are watching the same camera and allows for more secure network topologies. A Video Relay Server (VRS) 214 will pull one video stream from a camera and relay the video stream to a virtually limitless number of simultaneous users. The relaying of video relies on server(s) that have a much larger data throughput capability (usually located in high bandwidth data centers) and a significantly lower cost Internet connection (i.e., usually not metered).

Another benefit of using Video Relay Servers is that the camera's IP address can be kept secret or even secured behind a firewall or private network and the users only need connect to the Video Relay Server(s). The firewall on the camera communication link can then be configured to only allow access from the Video Relay Server, thereby essentially preventing a hacker/intruder from connecting directly to the camera.

Although Video Relay Servers improve the efficiency, scalability, and security of streaming cameras to multiple users, the Video Relay Server must continue to stay connected to the IP-enabled camera to ensure the video stream is available to a user when requested. This results in the video streaming over the metered data connection 24 hours a day, 7 days a week significantly increasing data costs, particularly when the metered data connection is a wireless channel.

Figure 3:
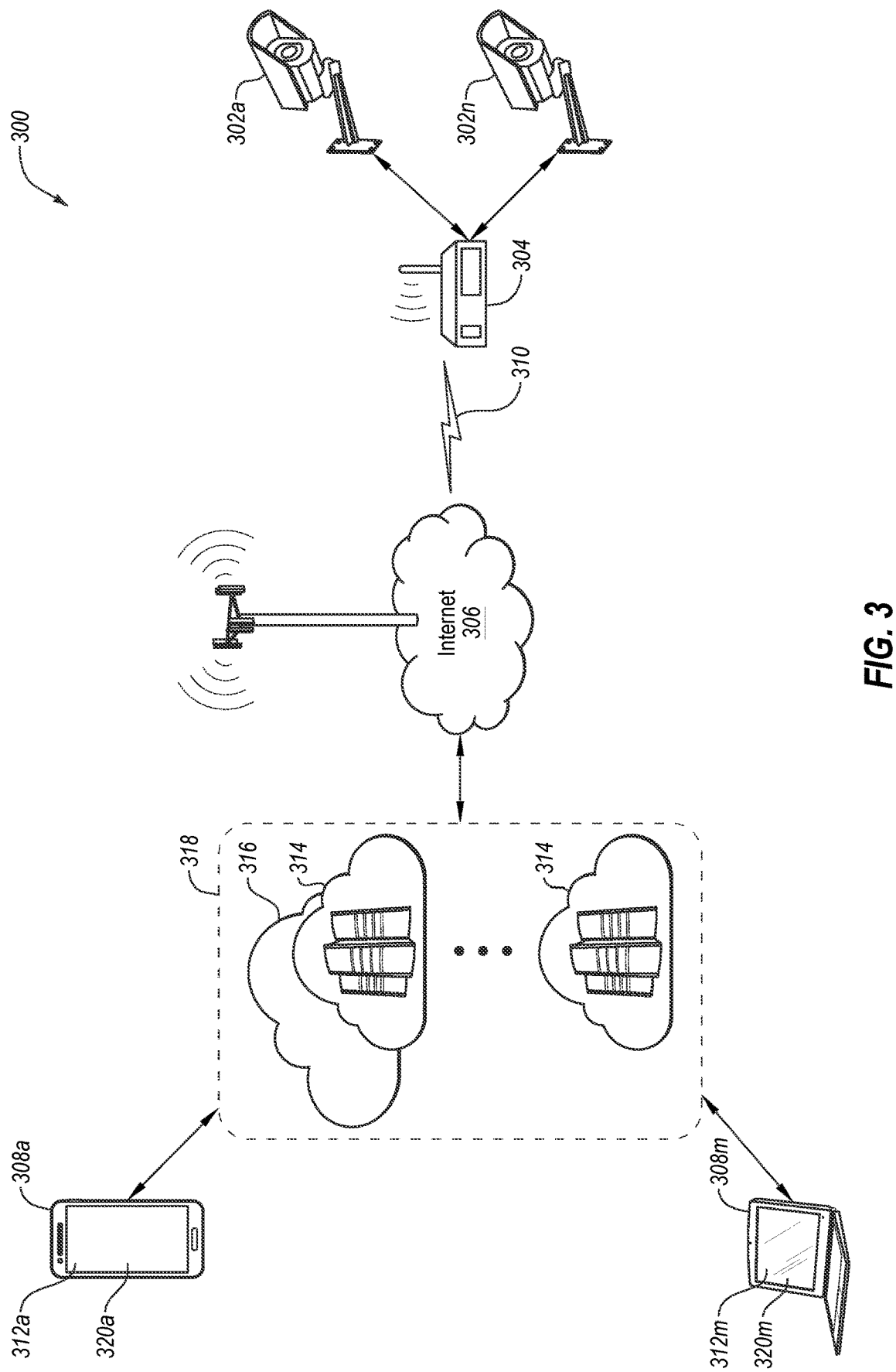
FIG. 3 illustrates a live video streaming system configured with a stream manager service, in accordance with an exemplary embodiment of the present disclosure.

FIG. 3 illustrates a video streaming system configured with a stream manager service, in accordance with an exemplary embodiment of the present disclosure. Video streaming system 300 includes one or more cameras 302a-302n (collectively referred to as "cameras 302"). Cameras 302 couple according to conventional wired or wireless methods to a wireless modem 304. Wireless modem 304 may be configured as a wireless modem operating according to one or more wireless standards including, but not limited to, cellular (mobile) and satellite standards. Cellular and mobile standards may include GPRS, UMTS, HSPA, EVDO, WiMax, etc., and may also be commonly known as mobile broadband services, whether fixed or mobile. Satellite standards may operate using one or more various satellite cellular standards and may further include stationary or orbiting satellites as well as high altitude airborne broadband. Other wireless standards, such as Wi-Fi, are also contemplated as being a standard through which the modem may also communicate live video data.

Cameras 302 may be configured as IP-enabled cameras and support both multicast video streaming and unicast video streaming. By way of example, unicast video streaming may be used for over-the-Internet live video streaming via Internet 306. A network, such as a back-end network 318, may couple to Internet 306 to provide management of streaming live video from cameras 302. Back-end network 318 includes one or more video relay servers (VRS) 314 configured to provide streaming of live video from a camera by connecting an IP-enabled camera 302 to a wireless modem 304. Connection between a user of user device 308a-308m and wireless modem 304 occurs over a wireless channel 310.

Back-end network 318 further includes a stream manager service 316, in communication with VRS 314, for managing connections over wireless channel 310 with cameras 302. Stream manager service 316 further interacts with user via a browser or application 312a-312m on a user device 308a-308m. VRS 314 also interfaces with a video player 320a-320m resident on user device 308a-308m. Stream manager service 316 interfaces with a VRS 314 that, in turn, brokers or supports the interaction with camera 302 and is configured to cause camera 302 to stream live video from camera 302 to VRS 314. VRS 314 continues streaming live video to user device 308a-308m until stream manager service 316 suspends or terminates transmissions by wireless modem 304, as further described below. According to various embodiments, back-end network 318 may include one or more stream manager services 316 (e.g., each VRS 314 may include a dedicated stream manager service 316 and/or a number (e.g., one or more) of servers may be associated with one or more stream manager services 316).

In the disclosed embodiment, live video streaming system 300 improves streaming of live video over metered data connections and supports both a virtually unlimited number of simultaneous users and only transmits data from the camera 302 when a user is actually watching the video stream at a user device 308a-308m. Video streaming system 300 does not require additional hardware onsite with cameras 302 or wireless modem 304 resulting in savings of both cost and power relating to metered communication expenses over wireless channel 310 and operational power for wireless modem 304 and cameras 302. Power for wireless modem 304 and cameras 302 may be provided by conventional power sources, including operation off-grid, such by a self-contained generator or through renewable energy (e.g., wind, solar, etc.).

As noted above, in some embodiments, a video streaming system (e.g., video streaming system 300) may include a plurality of servers (e.g., a plurality of video relay servers 314). In these embodiments, scheduling may be distributed across the plurality of servers. More specifically, in some embodiments, each server of the plurality of servers may monitor a database (e.g., a global database) (e.g., each server may compare its session ID with incoming requests) to determine which incoming requests to handle and/or maintain. Further, in some other embodiments, each server of a number of servers may include a dedicated database and requests may be published to an event store (also referred to as a "message store"). In these embodiments, each server of the number of servers may monitor the event store, acknowledge an event, and update its own database accordingly. In these embodiments (e.g., embodiments including multiple servers), a user may be assigned (e.g., in response to a user request) to a specific server (or a bank of servers) based on various criteria, such as server utilization (e.g., to select the server with the lowest utilization). Further, user/server assignment may be performed at a system level (e.g., all servers of a system) or at a number of servers that are assigned to the user (or a client that the user is associated with).

Figure 4:
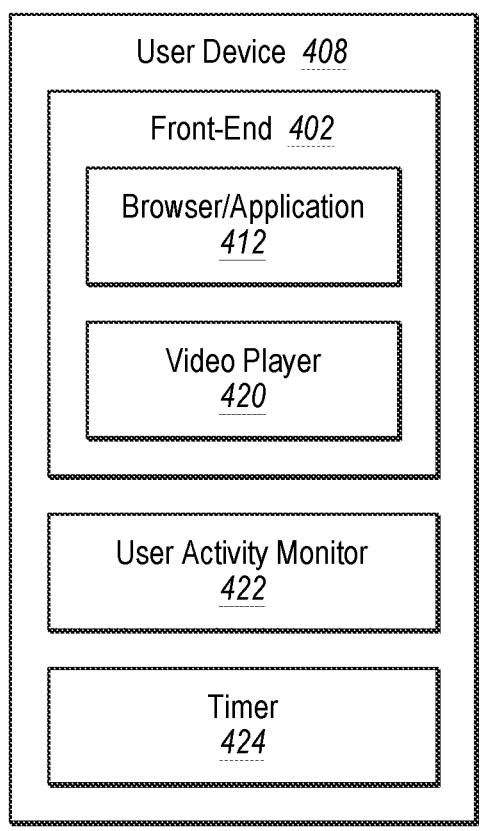
FIG. 4 illustrates a user device, in accordance with an exemplary embodiment of the present disclosure.

FIG. 4 is a block diagram of a user device 408, in accordance with an exemplary embodiment of the present disclosure. User device 408 may be suitable for any of user devices 108a, 108b, 208a-208m or 308a-308m of respective FIGS. 1-3. User device 408 may be one of a computer, smartphone, tablet, or other electronic device configured for displaying streaming live video. User device 408 includes a front-end portion 402, which includes at least a browser or application 412 and a video player 420. Browser or application 412 may communicate with video relay server (VRS) 314 and stream manager service 316. Video player 420 may also communicate with video relay server (VRS) 314 to receive and display a live video stream from one or more cameras 302 of FIG. 3.

User device 408 further includes a user activity monitor 422 for detecting or probing for interaction by a user in order to determine viewing of the live video stream by a user of user device 408. User device 408 further includes a timer 424, which is used to determine activity and inactivity by a user of user device 408 during streaming of live video to video player 420. As further described below, timer 424 may be reset upon the detection of activity by a user of user device 408 or may time out, thereby signaling inactivity of a user of user device 408.

According to some embodiments, a user device (e.g., user device 408) may be configured to receive multiple video streams (e.g., via multiple video players on the user device and/or via a web browser). In these embodiments, checkins and video sessions may be maintained for multiple video players running on a single user device. In these embodiments, each video session may have its own unique session ID. Each video player can time out. For example, a single user device may be receiving a number (e.g., six) video feeds at one time (e.g., six video feeds coming into a single pane). According to various embodiments, in this example, each of a number of (e.g., six) video sessions may be handled and/or maintained (e.g., according to various embodiments disclosed herein) independently. More specifically, each video stream may be independently monitored to determine, for example, whether the video stream starts, shuts-down, checkins, etc.

Figure 5:
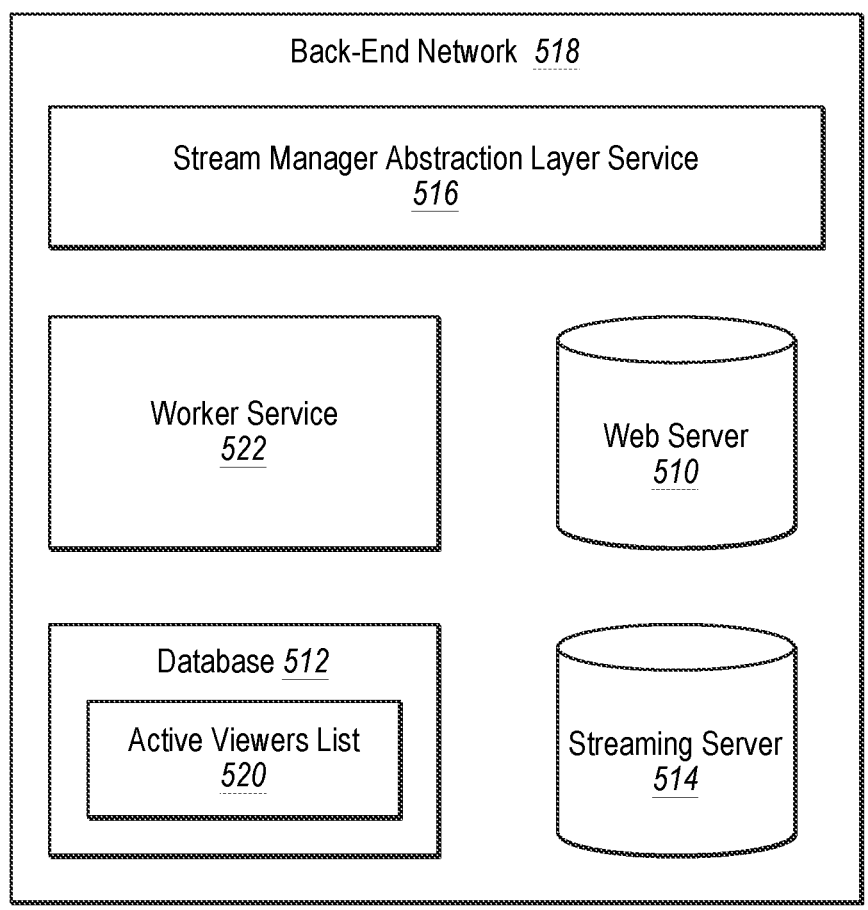
FIG. 5 illustrates back-end services occurring on one or more servers in a back-end network, in accordance with an embodiment of the present disclosure.
Figure 6A:
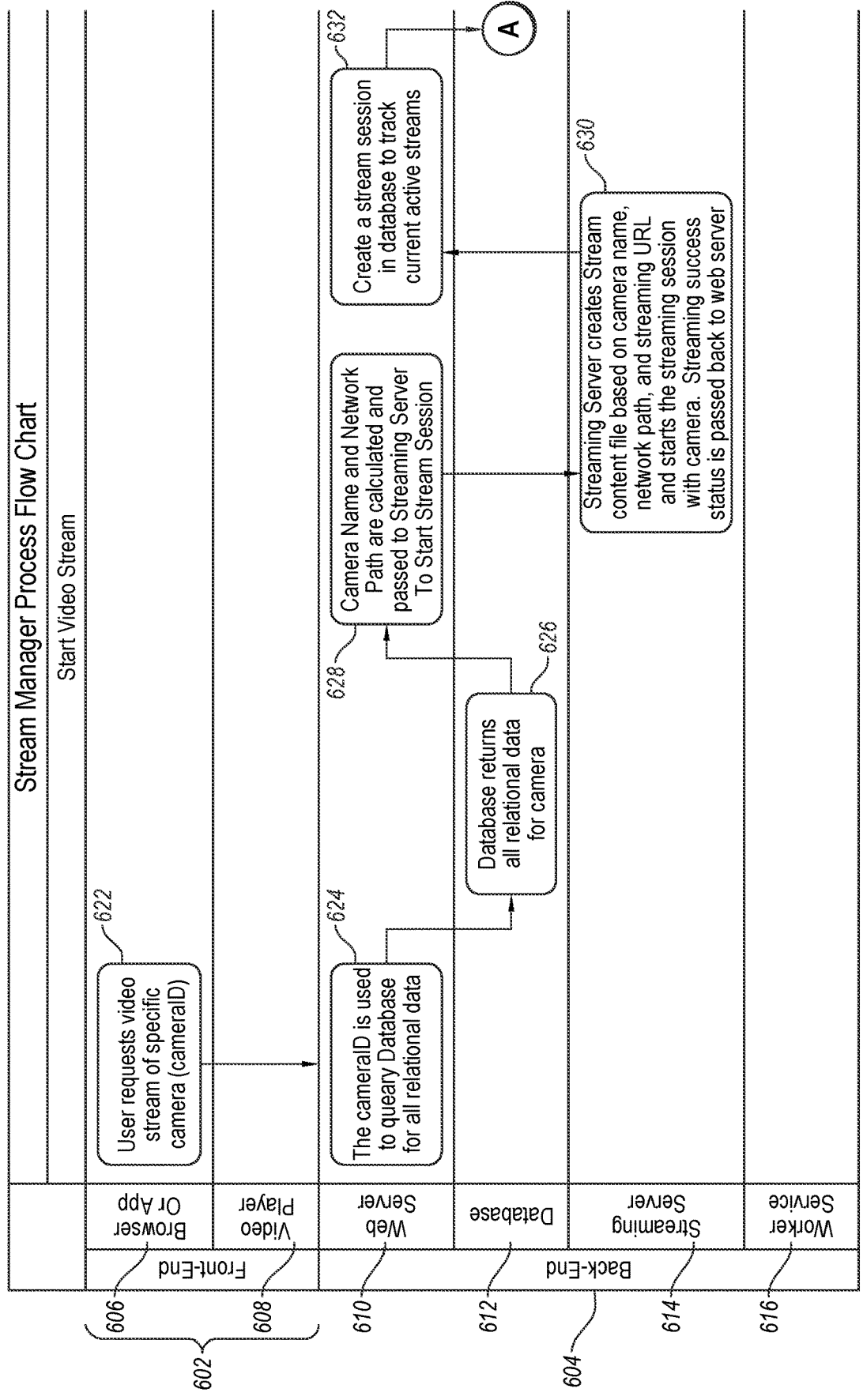
FIGS. 6A-6D are flowcharts depicting a method, according to an exemplary embodiment of the present disclosure.
Figure 6B:
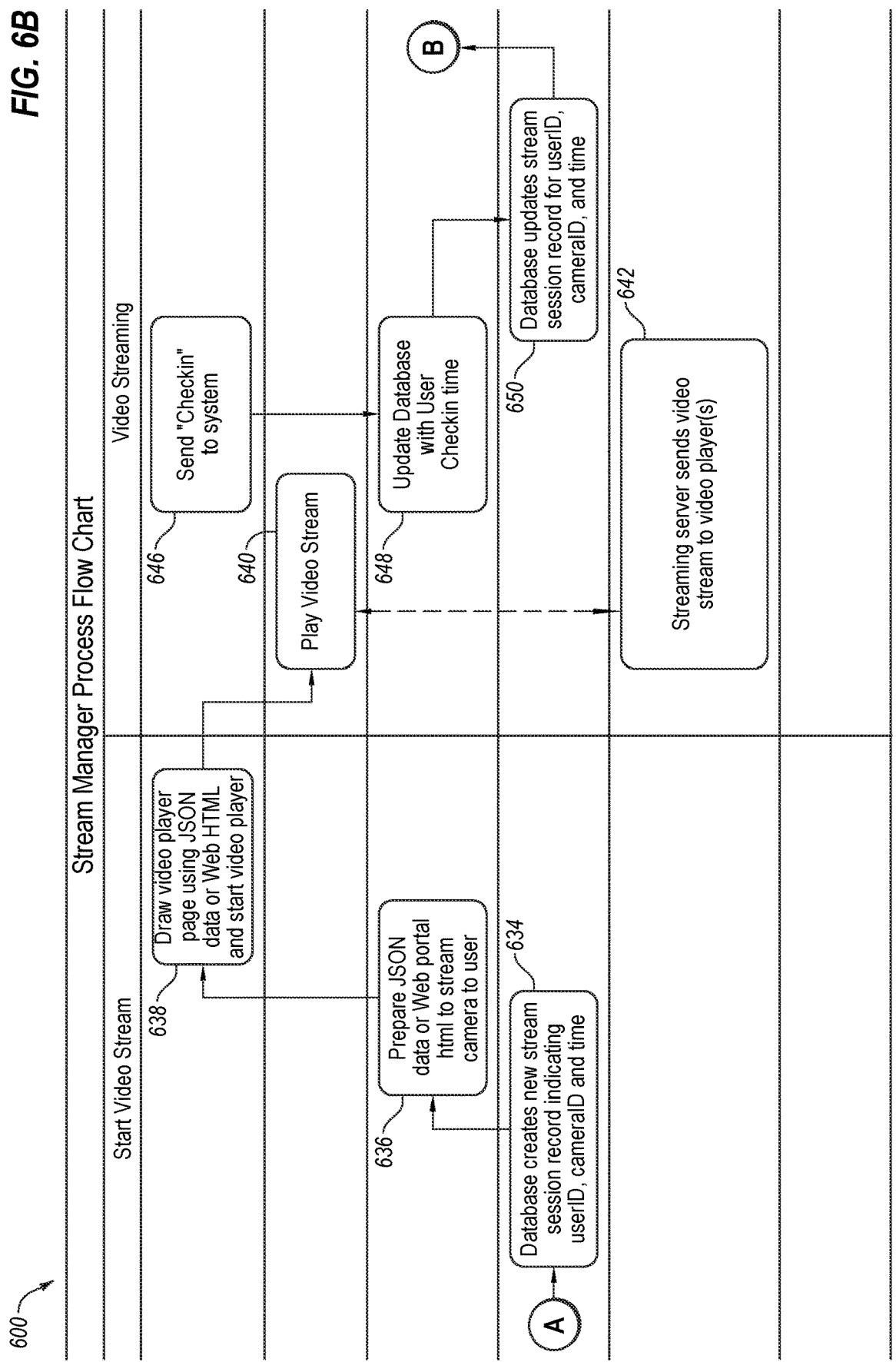
Figure 6C:
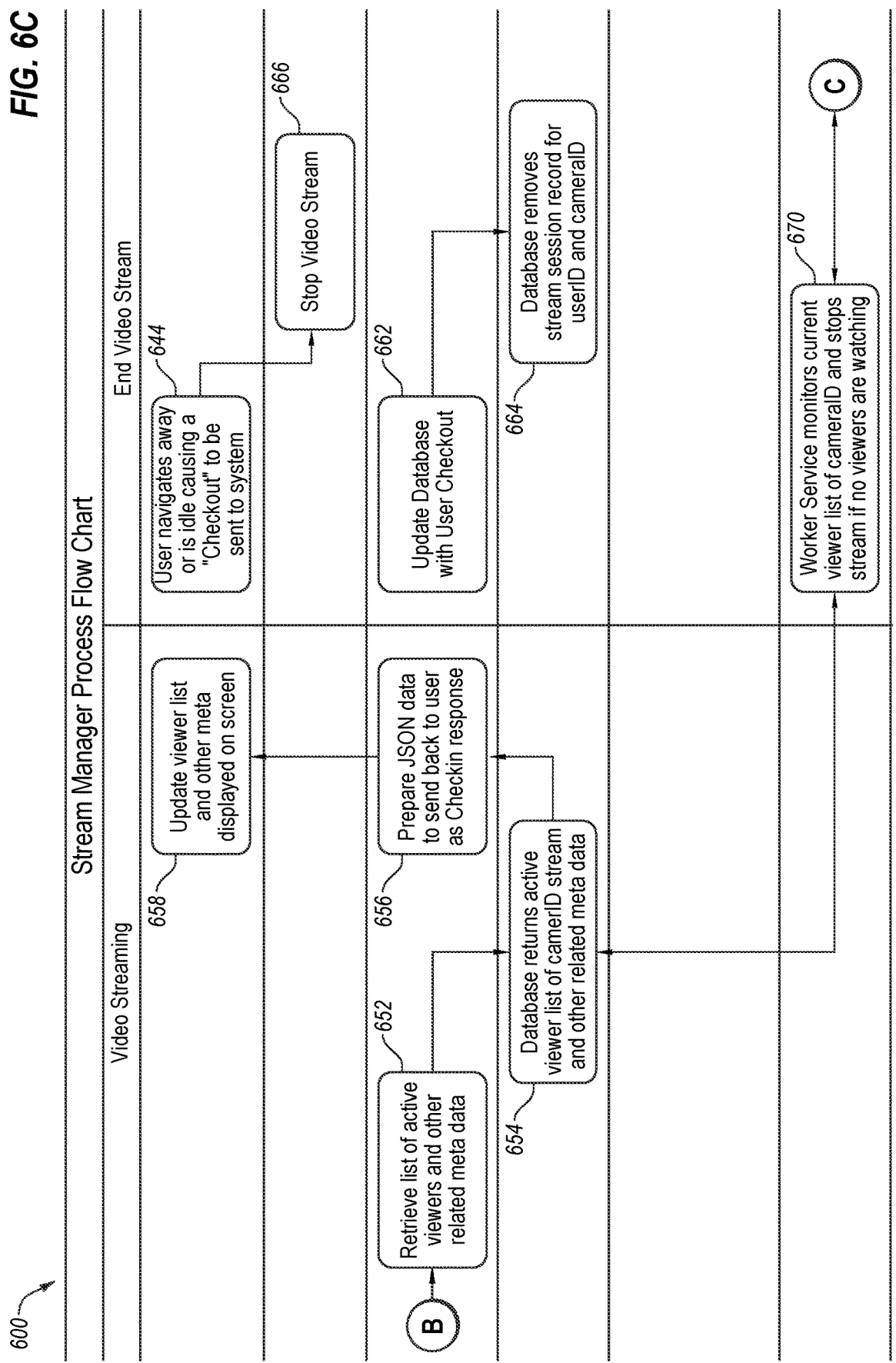
Figure 6D:
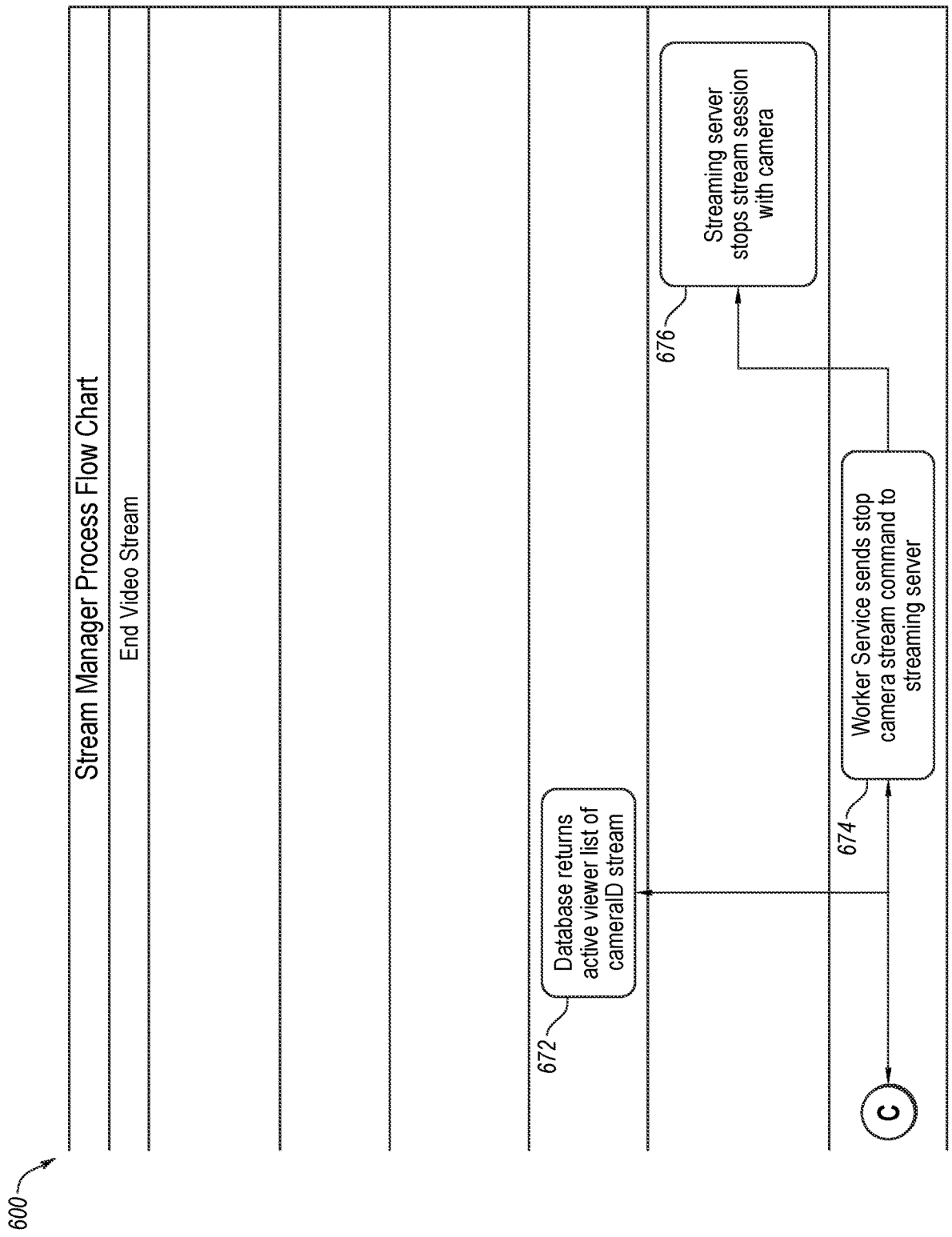

FIG. 5 is a block diagram of a back-end network 518, in accordance with an exemplary embodiment of the present disclosure. Back-end network 518 is an embodiment of back-end network 318 of FIG. 3. Back-end network 518 communicates with a transport/communication network such as Internet 306 of FIG. 3. Back-end network further communicates with user device 408 of FIG. 4, which may occur over Internet 306. Back-end network 518 includes various servers and services. By way of example and not limitation, back-end network 518 may include one or more web servers 510 configured for facilitating communication with Internet 306 and for providing communication between browser or application 412 and one or more databases 512. Each database 512 may include one or more lists, such as an active viewers list 520, which identifies viewers that are currently receiving a live video stream.

Back-end network 518 further includes at least one streaming server (or video relay server) 514, which facilitates a streaming session with camera 302 by starting and stopping stream sessions with camera 302. Streaming server or video relay server 514 further provides a live video stream to video player 420 of FIG. 4. Back-end network 518 further includes at least one worker service 522 that periodically monitors the active viewers list 520 and stops live video streaming by camera 302 when there are no viewers listed on the active viewers list 520.

Back-end network 518 further includes a stream manager service, which may be configured as a stream manager abstraction layer service 516 located on a server with the video relay server 514. Stream manager abstraction layer service 516 may be configured to dynamically start and stop streams on the video relay server 514 based on user activity determined in part by user activity monitor 422 and timer 424 of FIG. 4. Stream manager abstraction layer service 516 may be configured to (1) monitor camera streams and user activity to provide live video streams from cameras 302 to users of user devices 308a-308m when users request live streams and (2) shut down or terminate the live video streams from cameras via wireless modem 304 when the live video stream is no longer being viewed or accessed (i.e., user inactivity) by a user of user device 308a-308m. Terminating a live video stream that is not being actively viewed by a user can significantly reduce transmissions by wireless modem 304 resulting in reduced monthly metered data costs of cellular/satellite communication links over wireless channel 310.

According to various embodiments, video streams may be managed for authenticated users and unauthenticated users. As will be appreciated, upon receipt of a request from a known authorized user, a video streaming system (e.g., video streaming system 300) may assign the authorized user a specific identifier (e.g., a specific user ID), and the video streaming system may maintain a unique session ID for the authorized user. Further, upon receipt of a request from an unauthorized user, the system may assign the unauthorized user with a public identifier (e.g., a public user ID), and the system may maintain a unique session ID for each unauthorized user.

FIGS. 6A-6D illustrate a method for cost-effectively streaming live video from cameras 302 to one or more viewers over metered data connections, in accordance with an exemplary embodiment of the disclosure. Typically, cameras in remote areas are connected to the Internet via metered data connections like cellular or satellite that charge a monthly fee for every byte transmitted over their data networks. In an effort to minimize data usage over a costly or slow communication link, this method allows a camera to stream only when a user or a plurality of users are actively watching the video. When the user(s) are not watching the video stream the stream is terminated preventing any further data usage on the metered data connection.

A method 600 is performed between a front-end process 602 located on a user device 408 and a back-end process 604 located in back-end network 518. As disclosed, live video streaming system 300 includes a video relay server 514 with a stream manager abstraction layer service 516, which may be configured as a stream manager abstraction layer service 516 located on the video relay server 514. As stated above, stream manager abstraction layer service 516 may be configured to dynamically start and stop streams on the at least one video relay server 514 based on user activity. Stream manager abstraction layer service 516 may be configured to (1) monitor camera streams and user activity to provide live video streams from cameras 302 to users of user devices, when users request live streams and (2) shut down or terminate the live video streams from cameras via wireless modem 304 when the live video stream is no longer being viewed or accessed (i.e., user inactivity) by a user of user device. Also as stated above, terminating a live video stream that is not being actively viewed by a user can significantly reduce transmissions by wireless modem 304 resulting in reduced monthly metered data costs of cellular/satellite communication links over wireless channel 310.

Stream manager abstraction layer service 516 may be configured as a service on video relay server 514, which does not require an additional hardware server, or stream manager abstraction layer service 516 may be configured as a service on a separate hardware server. In either configuration, stream manager abstraction layer service 516 communicates with video relay server 514.

Stream manager abstraction layer service 516 works in conjunction with a user activity monitor 422 running in the background on a user device 408 and determines whether a user is actively watching a live video stream. When the user activity monitor 422 detects that a user is no longer actively watching a live video stream, a packet is sent to the stream manager abstraction layer service 516 indicating that the user is no longer watching. If the stream manager abstraction layer service 516 detects that no users are watching live video from a camera 302, then the live video stream from camera 302 is terminated and transmissions of the metered data over cellular/satellite communication links, such as wireless channel 310, also terminates.

FIGS. 6A-6D are flowcharts depicting a method according to an exemplary embodiment of the present disclosure. The flowchart depicting method 600 includes components distributed between a front-end process 602 and a back-end process 604 in video streaming system 300 of FIG. 3. Front-end process 602 includes a browser or application 606 and at least one video player 608. Browser or application 606 and video player 608 may be located within a user device 408 and are interactable with a user. Browser or application 606 may be configured to provide selectable options of one or more live video streams from corresponding one or more cameras 302. Browser or application 606 may further include the user activity monitor 422, which determines a lack of interaction with a user and declares that no user is watching the live video stream. Each video player 608 may be configured to display live video streams.

Back-end processes 604 include a web server 610, database 612, streaming server (or video relay server) 614, and worker service (or stream manager abstraction layer service) 616. Web server 610 is configured to facilitate communication with Internet 306 and to provide communication between browser or application 606 and database 612. Database 612 may include one or more lists, such as an active viewers list 520, which identifies viewers that are currently receiving a live video stream. Streaming server or video relay server 614 facilitates a streaming session with camera 302 by starting and stopping streaming sessions with camera 302. Streaming server 614 further provides a live video stream to video player 608. Back-end processes 604 further includes worker service 616 that periodically monitors the active viewers list 520 and stops live video streaming by camera 302 when there are no viewers listed on the active viewers list 520.

As stated, method 600 discloses a method for streaming live video from cameras to one or more users over data connections, such as metered data connections. Typically, cameras in remote areas are connected to the Internet via metered data connections like cellular or satellite wireless channels that charge a fee, such as monthly fee, for every byte transmitted over the wireless data networks. In an effort to minimize data usage over a costly or slow communication link, the method 600 allows a camera to stream only when a user or a plurality of users are actively watching the live video. When the user(s) are not watching the live video stream, the stream is terminated, thereby preventing any further data usage on the metered data connection such as wireless channel 310.

Method 600 describes a method for dynamically starting and stopping live camera streams based on user demand. In a step 622, a user (e.g., an authorized user or unauthorized user) requests a particular live video stream. When a user desires to watch a live video stream from a specific camera (s), the user makes a request to view the camera by selecting on a user interface in browser or application 606 a camera

302. A specific camera may be selected from various arrays or formats, including a list of cameras, a geolocation map of cameras, or other criteria.

In a step 624, web server 610 performs a request from database 612. The request (which includes the specific camera id) is picked up by the stream manager abstraction layer service 516 and the requested camera id is retrieved in a step 626 out of a database 612 including, but not limited to, camera name, IP address, port, streaming URL, etc.

In a step 628, web server 610 calculates a camera stream name and a network path. The camera stream name, network path and stream URL are calculated and passed to the video relay server 614 to establish a connection to the camera 302. When the camera stream is available for playback on the video relay server 614 in a step 630, a status (e.g., camera_stream_start_success) is returned to the stream manager abstraction layer service 616.

In a step 632, a user is added to an active viewers list 520 in the database 612. The stream manager abstraction layer service 516 creates a user entry in the active viewers list 520 for the specific camera 302 (all subsequent viewing users are also added to the active viewers list) to keep track of the quantity of active viewers watching the live video stream from the selected camera. In a step 634, the database creates a new stream session recording indication (e.g., userID, cameraID and time).

In a step 636, the stream manager abstraction layer service generates the HTML/Javascript code (including the streaming server IP/stream relay URL, video player, and user activity monitor javascript service) and to forward to the user device 408. In a step 638, the video player 608 and user activity monitor 422 are started. In a step 640, the video player 608 and user activity monitor 422 are started on the user device 408. In a step 642, the streaming server 614 sends the live video streams to video player 608 for the user to watch.

As the user watches the live video stream from the camera feed, the user's mouse movements/clicks, keystrokes, screen taps, etc., on the user device 408 are monitored by the user activity monitor 422 to determine activity. A timer 424 avoids timing out at a predetermined interval by being reset when user interaction on the user device 408 is detected. Accordingly, as long as the user is actively watching the live video stream, the user activity monitor will reset the timer 424 and avoid generating a "timeout."

If a timeout of the timer 424 occurs, then the video player 608 is stopped, and in a step 644 (see FIG. 6C), an indicator (e.g., a checkout indicator of user inactivity) based on inactivity of the user of the user device is sent to the stream manager abstraction layer service 516 to terminate live video stream.

If user activity monitor 422 detects user activity again, then in a step 646 an indicator (e.g., a checkin indicator of user activity) is sent to the stream manager abstraction layer service 516 requesting a start or restart of the video stream, the video player 608 is resumed, and the timer 424 is reset. The process repeats for as long as the user is viewing a live video stream.

As stated and concurrent with monitoring for a timeout of timer 424, the user activity monitor 422 sends a "checkin" indicator such as a user activity indicator, in step 646, to the stream manager abstraction layer service 516 at a regular interval letting the system know the user of user device 408 is still actively watching the video stream. A step 648 sends an update including the "check in" time to the database 612 in a step 650 where the database may update the stream session record for the userID, cameraID and time. A step 652 retrieves the list of active viewers and other related metadata. In step 654, the database returns the active viewer list of cameraID streams and other related metadata to the web server. The web server in a step 656 prepares data to send back to the user in response to the "checkin" indicator. In a step 658, the viewer list and other data is displayed on the browser for the user.

If the stream manager abstraction layer service 516 does not see a "checkin" indicator within the predetermined interval, then the stream manager abstraction layer service 516 will consider the user inactive and, in a step 644, initiate a removal of user from the active viewers list 520. The response from the stream manager abstraction layer service 516 may include metadata that can be used to display camera information including, but not limited to, camera viewer count, ptz coordinates, user control state, etc. If no active video watching is detected then the user activity monitor 422 will stop the video player 608 and send a "checkout" to the stream manager abstraction layer service 516.

In a step 662, the database 612 is updated and in step 664, the user is removed from the active viewers list 520 when the stream manager abstraction layer service receives a "checkout" from the user activity monitor 422. This results in the user being removed from the active viewers list 520 for that specific camera by updating the database in steps 662 and 664. The camera stream on the video relay server 614 is terminated and in a step 666, causes the video streaming in the video player 608 to cease.

If the number of users in the active viewers list 520 for a specific camera is zero (no more camera viewers), then the stream manager abstraction layer service 516 will terminate the camera stream on the video relay server 614.

Steps 670, 672, 674 and 676 access the database and based on the active viewer list, stop the streaming server and end the session with the camera.

Figure 7:
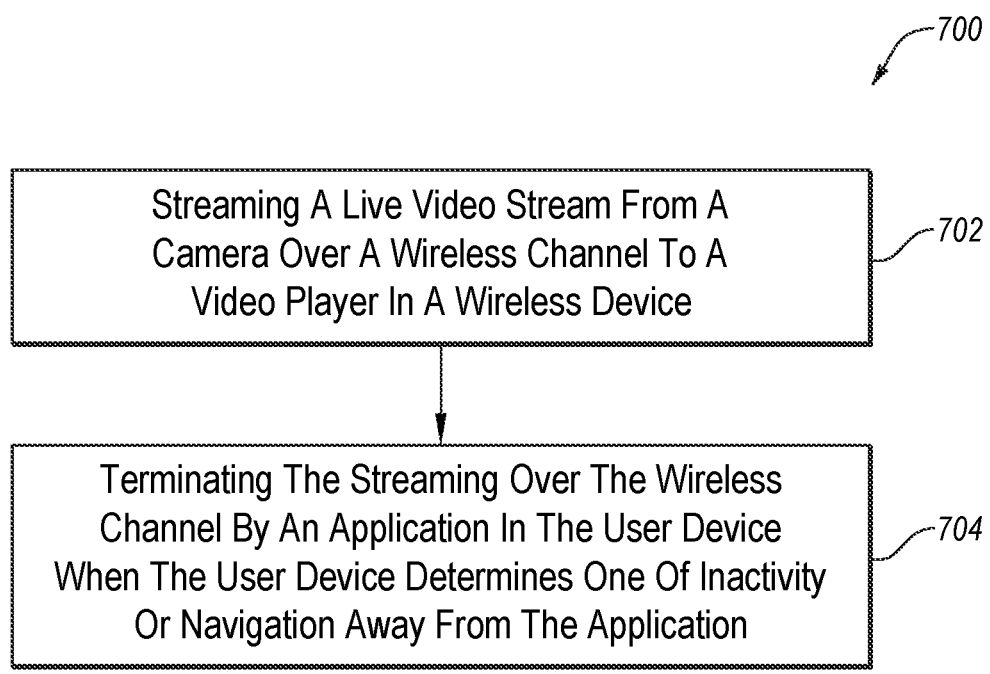
FIG. 7 is a flowchart of a method for streaming a live video stream to a user device.

FIG. 7 is a flowchart of a method for streaming a live video stream to a user device, in accordance with an embodiment of the present disclosure. With reference to FIGS. 1-6, method 700 includes a step 702 of streaming a live video stream from a camera over a wireless channel to a video player in a user device. Method 700 further includes a step 704 of terminating the streaming over the wireless channel by an application of the user device when the user device determines one of inactivity of a user of the user device with the application or navigation on the user device away from the application.

A method for cost-effectively streaming live video from cameras to one or more viewers over metered data connections has been disclosed. Typically, cameras in remote areas are connected to the Internet via metered data connections like cellular or satellite that charge a monthly fee for every byte transmitted over their data networks. In an effort to minimize data usage over a costly or slow communication link, this method allows a camera to stream only when a user or a plurality of users are actively watching the video. When the user(s) are not watching the video stream the stream is terminated preventing any further data usage on the metered data connection.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A system, comprising:
a back-end network configured to:
receive, via a first connection, a video stream from at least one camera;
transmit, via one or more second connections, the video stream to one or more user devices;
cause the video stream from the back-end network to a user device of the one or more user devices to be terminated; and
cause the video stream from the at least one camera to the back-end network to be terminated in response to determining that the back-end network is not transmitting the video stream to at least one user device of the one or more user devices.

2. The system of claim 1, further comprising the user device, the user device configured to periodically send an indicator to the back-end network to check-in and indicate a request to continue receiving the video stream.

3. The system of claim 2, wherein the user device is further configured to reset a timer for use in determining user inactivity of an associated user.

4. The system of claim 2, wherein the back-end network is further configured to update a database with a time when receiving the indicator.

5. The system of claim 1, wherein the back-end network is further configured to continue to transmit the video stream to the user device via a second connection of the one or more second connections in response to reception of an indicator at the back-end network indicating that a user of the user device is actively viewing the video stream.

6. The system of claim 5, wherein the back-end network is configured to cause the video stream from the back-end network to the user device to be terminated in response to lack of receipt of the indicator within a predetermined time interval.

7. The system of claim 1, wherein the first connection and each of the one or more second connections is a metered connection.

8. The system of claim 1, wherein the back-end network is remote from each of the at least one camera and each of the one or more user devices.

9. The system of claim 1, wherein the back-end network is further configured to update a database based on user activity and user inactivity.

10. A method, comprising:
receiving, at a back-end network and via a first connection, a video stream from a camera;
conveying, via one or more second, different connections, the video stream from the back-end network to one or more user devices;
terminating the video stream from the back-end network to a user device of the one or more user devices in response to lack of receipt of an indicator at the back-end network within a predetermined time interval; and
terminating the video stream from the camera to the back-end network in response to determining that the back-end network is not transmitting the video stream to at least one user device of the one or more user devices.

11. The method of claim 10, further comprising receiving, at the back-end network and prior to terminating the video stream from the back-end network, a request from the user device to continue receiving the video stream.

12. The method of claim 10, further comprising:
receiving, at the back-end network and via a third connection, a second video stream from a second camera;
conveying, via a fourth connection, the second video stream from the back-end network to one or more second user devices;
terminating the second video stream from the back-end network to a second user device of the one or more second user devices; and
terminating the second video stream from the camera to the back-end network in response to determining that the back-end network is not transmitting the second video stream to at least one second user device of the one or more second user devices.

13. The method of claim 10, further comprising, prior to terminating the video stream from the back-end network, continuing to convey the video stream to the user device via a second, different connection of the one or more second, different connections in response to receipt of a signal at the back-end network indicating that a user of the user device is actively viewing the video stream.

14. The method of claim 10, wherein terminating the video stream from the back-end network to the user device in response to lack of receipt of the indicator at the back-end network within the predetermined time interval comprises terminating the video stream from the back-end network to the user device in response to lack of receipt of the indicator within the predetermined time interval indicating that a user of the user device is actively viewing the video stream.

15. A system, comprising:
at least one camera configured to transmit a video stream;
one or more user devices; and
a back-end network configured to:
receive the video stream from the at least one camera;

transmit the video stream to the one or more user devices;

cause the video stream from the back-end network to a user device of the one or more user devices to be terminated; and cause the video stream from the at least one camera to the back-end network to be terminated in response to determining that the back-end network is not transmitting the video stream to at least one user device of the one or more user devices.

16. The system of claim 15, wherein the video stream is transmitted from the at least one camera via a metered channel.

17. The system of claim 15, wherein the video stream is transmitted from the back-end network to the one or more user devices via a metered channel.

18. The system of claim 15, wherein the back-end network includes a video relay server communicatively coupled between the at least one camera and the one or more user devices.

19. The system of claim 15, wherein the back-end network is further configured to continue transmission of the video stream from the back-end network to the user device in response to receipt, at the back-end network, of an indicator from the user device within a predetermined time interval, the indicator indicating that a user of the user device is actively viewing the video stream.

20. The system of claim 19, wherein the back-end network is configured to cause the video stream from the back-end network to the user device to be terminated in response to lack of receipt of the indicator within the predetermined time interval.

* * * * *